United States Patent [19]
Nowell et al.

[11] 3,758,852
[45] Sept. 11, 1973

[54] DECREASE IN FREQUENCY DETECTOR

[75] Inventors: John R. Nowell, Phoenix; Luther L. Genuit, Scottsdale, both of Ariz.

[73] Assignee: Honeywell Information Systems Inc., Waltham, Mass.

[22] Filed: Mar. 2, 1972

[21] Appl. No.: 231,218

[52] U.S. Cl. .......................... 324/78 Q, 340/253 Y
[51] Int. Cl. ...................... G01r 23/02, G08b 21/00
[58] Field of Search ................ 324/78 Q, 161, 78 E; 340/263, 253 Y; 307/233, 305; 317/147

[56] References Cited
UNITED STATES PATENTS
3,527,965  9/1970  Hawkins et al. ................ 340/263 X
3,184,606  5/1965  Ovenden et al. .................. 324/78 Q

OTHER PUBLICATIONS

Deboo et al., "Integrated Circuits and Semi-Conductor Devices: Theory and Application," JK-787-85 D4 pp. 428, 494 & 495.
Mathews; Nat. Bur. Standards Tech. Note No. 237, April 10, 1964. 307-233.

*Primary Examiner*—Alfred E. Smith
*Attorney*—Lloyd B. Guernsey et al.

[57] ABSTRACT

A pair of diodes, a capacitor, a pair of resistors and a silicon unilateral switch detect a decrease in the frequency of an A.C. power source below a threshold value. When the frequency decreases below the threshold value, the detector provides a warning signal.

7 Claims, 3 Drawing Figures

DECREASE IN FREQUENCY DETECTOR

BACKGROUND OF THE INVENTION

This invention relates to a decrease in frequency detector and particularly to a circuit which detects the slowing down of a motor-generator set which may be used to supply power to a data processing system.

In modern data processing systems it is important that a steady source of electric power be used to provide a continuous supply of electrical current to the processing system. Any interruptions of power for even a few milliseconds may cause the introduction of error signals into the system. These error signals may cause changes in the data stored in the system. During an electric storm it is quite common for many power interruptions of 200–600 milliseconds to occur on the lines from the public utility companies. Several methods of eliminating the brief interruptions in the supply of electrical power to the data processing system have been tried. One method of reducing the number of interruptions of power to the data processing system is to use a motor-generator or MG set.

The motor of the MG set is connected to the electrical power line and supplies power to rotate the generator of the set. The generator of the MG set supplies the A.C. power to the data processing system. Brief power interruptions of a few hundred milliseconds will cause very little effect on the operation of the MG set; however, long interruptions of power may cause the MG set to slow down and cause the amount of the voltage from the generator of the MG set to decrease. A decrease in the value of the voltage supplied to the data processing system may cause error signals to be introduced into the data processing system. Therefore, it is important to be able to detect when the speed of the MG set decreases below a predetermined value. When the speed of the MG set decreases the frequency of the A.C. from the generator decreases. This decrease in frequency of the A.C. may be used to detect the decrease in speed of the MG set so that corrective action may be taken to prevent the introduction of errors into the data processing system.

It is, therefore, an object of this invention to provide a new and improved circuit for detecting a decrease in the frequency of an A.C. power source.

Another object of this invention is to provide a detector which produces an alarm signal when the frequency of an A.C. source decreases below a predetermined value.

A further object of this invention is to provide an inexpensive circuit which detects a decrease in the frequency of an A.C. source.

SUMMARY OF THE INVENTION

The foregoing objects are achieved in the present invention by providing a decrease in frequency detector which provides a warning signal when the frequency of an A.C. source decreases below a predetermined threshold value. A calibration circuit is provided so that the threshold value of frequency can be adjusted to any desired value.

Other objects and advantages of this invention will become apparent from the following description when taken in connection with the accompanying drawings.

Figure 1:
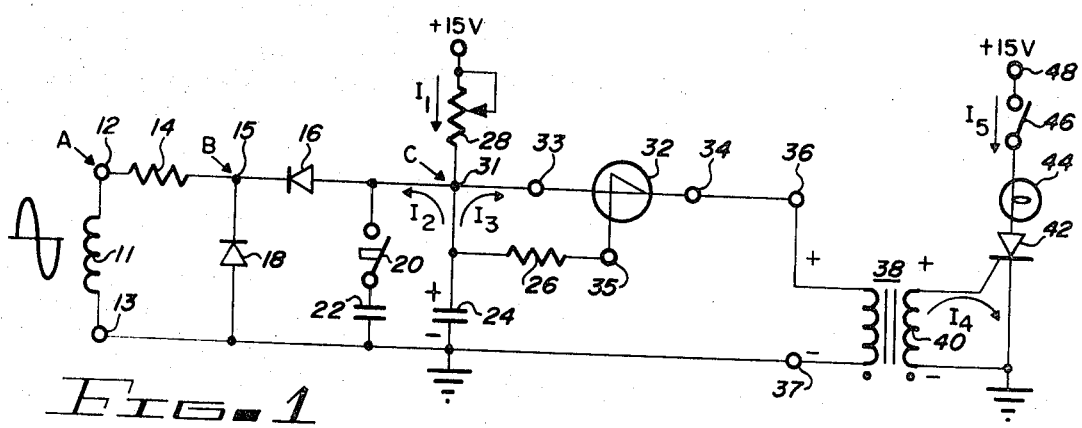
FIG. 1 is a circuit diagram of one embodiment of the present invention.
Figure 3:
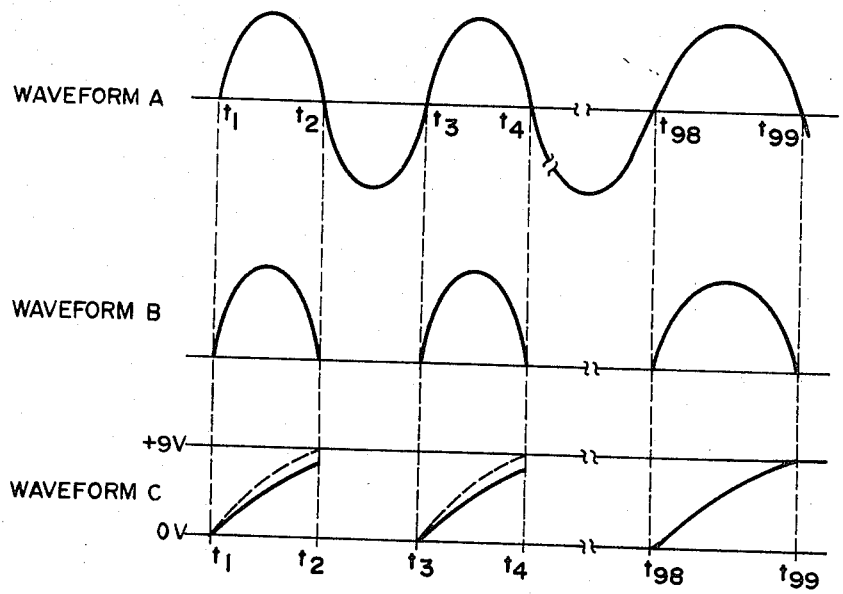
FIG. 3 illustrates waveforms which are useful in explaining the operation of the invention shown in FIG. 1.

The decrease in frequency detector shown in FIG. 1 has a pair of signal-input terminals 12 and 13 which may be connected to any source of A.C. power such as one phase of a winding 11 from a 3-phase generator. Signals such as those shown in waveform A of FIG. 3 may be applied to the input terminals. A first reference potential such as +15 volts may be applied to an RC circuit which includes resistor 28 and capacitor 24. During the positive portion of each A.C. input voltage cycle capacitor 24 charges. During the negative portion of each A.C. input voltage cycle capacitor 24 discharges. The value of the charge on the capacitor is determined by the time duration of the positive portion of the input voltage. As the frequency of the A.C. input voltage decreases the time duration of the positive portion of the input voltage increases. As the time duration of the positive portion of the input voltage increases capacitor 24 charges to a greater value of voltage. When this voltage across capacitor 24 reaches a predetermined threshold voltage the circuit of FIG. 1 provides a warning signal.

During the positive portion of the input voltage cycle at terminal 12 the diode 16 is rendered nonconductive. When diode 16 is nonconductive a current $I_1$ flows from terminal 30 through resistor 28 to the upper plate of capacitor 24, from the lower plate of capacitor 24 to a second reference potential, such as ground. Current $I_1$ charges capacitor 24 to the polarity shown in FIG. 1. During the negative portion of the A.C. cycle a current $I_2$ flows from the upper plate of capacitor 24 through diode 16, resistor 14 and winding 11 to the lower plate of capacitor 24, thereby dicharging capacitor 24.

When the frequency of the A.C. input voltage is greater than a predetermined value, capacitor 24 charges for a relatively short time so that the voltage across capacitor 24 does not reach a high enough potential to cause any current to flow through a silicon unilateral switch 32. The value of resistor 14 should be selected so that capacitor 24 discharges completely on the negative portion of the A.C. input voltage cycle. When the frequency of the A.C. input voltage at terminals 12 and 13 is greater than the predetermined value the voltage across capacitor 24 has the waveform shown in the solid lines of waveform C of FIG. 3 between time $t_1$ and time $t_2$.

When the frequency of the A.C. input shown in waveform A decreases the time duration of the positive voltage increases as shown between times $t_{98}$ and $t_{99}$, thereby allowing capacitor 24 to charge for a longer period of time. The longer charging time causes the voltage across capacitor 24 to increase to a larger value. When the voltage across capacitor 24 reaches a predetermined value, such as the +9 volts, the silicon unilateral switch 32 is rendered conductive.

The silicon unilateral switch is a semiconductor device having an anode, a cathode and a gate. The silicon unilateral switch can be used as an ON-OFF switch that can be turned on or off in a fraction of a millisecond.

Normally the silicon unilateral switch cannot conduct current from anode to cathode thereof until a positive voltage greater than a threshold value or "switching voltage" exists between the anode and the cathode. If a positive voltage greater than the switching voltage exists between the anode and the cathode the switch "turns on" i.e. is rendered conductive and the current will flow from the anode to the cathode. Once anode-cathode flow commences the switch can be "turned off" i.e., rendered nonconductive by reducing the anode to cathode current flow below a "holding current" or minimum current value. The gate of the silicon unilateral switch can be connected through a resistor to the anode so that a sudden increase in voltage on the anode will not cause a sudden increase of current which may cause damage to the silicon unilateral switch. If voltages on the anode do not change suddenly the gate of the switch can be left disconnected.

When switch 32 is rendered conductive a current $I_3$ flows from the upper plate of capacitor 24, from anode 33 to cathode 34 of the silicon unilateral switch, through the primary winding 39 of transformer 38 to the lower plate of capacitor 24. Current $I_3$ through the primary winding 39 produces the electrical polarities shown across primary winding 39 and across secondary winding 40. The voltage across secondary winding 40 causes a current $I_4$ to flow from the upper end of secondary winding 40, from gate to cathode of the silicon controlled rectifier 42 to the lower end of secondary winding 40. Current $I_4$ causes silicon controlled rectifier 42 to be rendered conductive so that a current $I_5$ flows from terminal 48 through switch 46, lamp 44 and silicon controlled rectifier 42 to ground. Current $I_5$ through lamp 44 causes the lamp to light to show that the frequency of the A.C. power connected to signal-input terminals 12 and 14 has decreased below the threshold value.

The silicon controlled rectifier is a semiconductor device having an anode, a cathode and a gate. The silicon controlled rectifier can be used as an ON-OFF switch which can be turned on in a very few milliseconds. Normally, the silicon controlled rectifier cannot conduct current between anodes and cathodes thereof until a pulse of current larger than a threshold value flows from gate to cathode. If a positive voltage difference exists between the anode and the cathode when the pulse of current flows in the gate, the silicon controlled rectifier "fires;" i.e., is rendered conductive, and a current will flow from the anode to the cathode. Once anode-cathode flow commences, the gate has no further control over such current flow. Current flow from anode to cathode in the rectifier can be terminated only by reducing the anode to cathode current below a "holding" or minimum current value. A more detailed description of the operation of the silicon controlled rectifier can be found in the Silicon Controlled Rectifier Manual, 4th Edition, 1967, published by the General Electric Company, Syracuse, New York.

Figure 2:
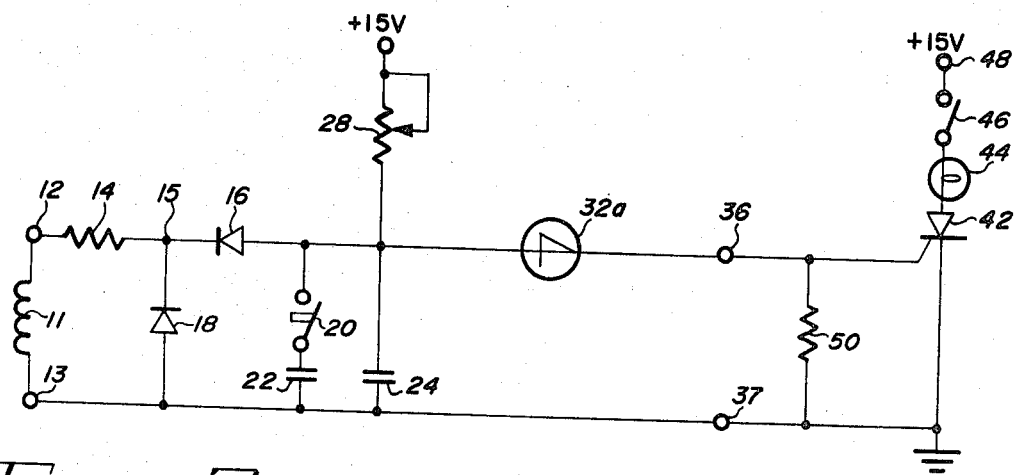
FIG. 2 is a circuit diagram of another embodiment of the present invention.

In some data processing system it may be desirable to connect a logic circuit to output terminals 36 and 37 of FIGS. 1 and 2. The logic circuit may be used with the silicon controlled rectifier or the portion of the circuit shown to the right of terminals 36 and 37 may be replaced by the logic circuit.

FIG. 2 discloses a four-layer diode 32a which may be used as a replacement for the silicon unilateral switch of FIG. 1. Other threshold devices may also be used as replacements for the silicon unilateral switch.

Switch 20 and capacitor 22 provide a calibration circuit for the decrease in frequency detector. During normal operation switch 20 is closed so that the total capacity in the circuit includes the capacity of capacitors 22 and 24. During the time that the circuit is being calibrated a standard frequency of input signal is applied to the signal-input terminals 12 and 13 and switch 20 is opened. When switch 20 is open the capacity between the junction point 31 and ground is reduced so that the voltage across capacitor 24 increases at a faster rate than when capacitor 22 is connected in parallel with capacitor 24. This faster rate of charge is illustrated by the dashed lines in waveform A of FIG. 3. Reducing the capacity in the circuit has the same effect as keeping the full capacity of the circuit and reducing the frequency of the A.C. power. For example, when the values of capacitors 22 and 24 are correctly selected, opening switch 20 without changing the frequency of the A.C. power produces the same charge on capacitor 24 as decreasing the frequency of the A.C. power by 15 percent with capacitors 22 and 24 connected in parallel. When switch 20 is open the rheostat 28 can be adjusted so that the warning light comes on with the normal frequency of A.C. power applied to input terminals 12 and 13.

Diode 18 provides a low impedance between the junction point 15 and ground so that the capacitors 22 and 24 will not charge to the reverse polarity during the portion of the cycle when these capacitors are discharging through diode 16 and resistor 14.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A decrease in frequency detector for use with an A.C. power source, said detector comprising:
   first and second signal-input terminals, said source being connected between said first and said second input terminals;
   first and second reference potentials, said second input terminal being connected to said second potential;
   first and second resistors;
   a first capacitor, said first resistor being connected between said first potential and a first plate of said first capacitor, said second potential being connected to a second plate of said first capacitor;
   first and second diodes each having an anode and a cathode, said anode of said first diode being connected to said first plate of said first capacitor, said second resistor being connected between said first input terminal and said cathode of said first diode, said second diode being connected between said second potential and said cathode of said first diode;
   a silicon unilateral switch having an anode, a cathode and a gate; and first and second output terminals, said unilateral switch being connected between said first plate of said first capacitor and said first output terminal, said second output terminal being connected to said second potential.

2. A decrease in frequency detector as defined in claim 1 including:
a silicon controlled rectifier having an anode, a cathode and a gate, said cathode of said rectifier being connected to said second potential, said gate of said rectifier being coupled to said first output terminal; and
a lamp, said lamp being connected between said first potential and said anode of said rectifier.

3. A decrease in frequency detector as defined in claim 1 including:
a transformer having a primary winding and a secondary winding, said primary winding being connected between said first and said second output terminals;
a silicon controlled rectifier having an anode, a cathode and a gate, said cathode of said rectifier being connected to said second potential, said secondary winding of said transformer being connected between said gate and said cathode of said rectifier; and
a lamp, said lamp being connected between said first potential and said anode of said rectifier.

4. A decrease in frequency detector as defined in claim 1 including:
a second capacitor;
a switch, said switch being connected between a first plate of said second capacitor and said first plate of said first capacitor, a second plate of said second capacitor being connected to said second potential; and
a rheostat, said rheostat being connected between said first potential and said first plate of said first capacitor.

5. A decrease in frequency detector as defined in claim 1 including:
a transformer having a primary winding and a secondary winding, said primary winding being connected between said first and said second output terminals;
a silicon controlled rectifier having an anode, a cathode and a gate, said cathode of said rectifier being connected to said second potential, said secondary winding of said transformer being connected between said gate and said cathode of said rectifier;
a lamp, said lamp being connected between said first potential and said anode of said rectifier;
a second capacitor;
a switch, said switch being connected between a first plate of said second capacitor and said first plate of said first capacitor, a second plate of said second capacitor being connected to said second potential; and
a rheostat, said rheostat being connected between said first potential and said first plate of said first capacitor.

6. A decrease in frequency detector as defined in claim 1 including:
a silicon controlled rectifier having an anode, a cathode and a gate, said cathode of said rectifier being connected to said second potential, said gate of said rectifier being coupled to said first output terminal;
a lamp, said lamp being connected between said first potential and said anode of said rectifier;
a second capacitor;
a switch, said switch being connected between a first plate of said second capacitor and said first plate of said first capacitor, a second plate of said second capacitor being connected to said second potential; and
a rheostat, said rheostat being connected between said first potential and said first plate of said first capacitor.

7. A decrease in frequency detector for use with an A.C. power source, said detector comprising:
first and second signal-input terminals, said source being connected between said first and said second input terminals;
first and second reference potentials, said second input terminal being connected to said second potential;
first and second resistors;
a first capacitor, said first resistor being connected between said first potential and a first plate of said first capacitor, said second potential being connected to a second plate of said first capacitor;
first and second diodes each having an anode and a cathode, said anode of said first diode being connected to said first plate of said first capacitor, said second resistor being connected between said first input terminal and said cathode of said first diode, said second diode being connected between said second potential and said cathode of said first diode;
a four-layer diode having an anode and a cathode;
first and second output terminals, said four-layer diode being connected between said first plate of said first capacitor and said first output terminal, said second output terminal being connected to said second potential;
a silicon controlled rectifier having an anode, a cathode and a gate, said cathode of said rectifier being connected to said second potential, said gate of said rectifier being coupled to said first output terminal; and
a lamp, said lamp being connected between said first potential and said anode of said rectifier.

* * * * *